(12) United States Patent
Nagarkar

(10) Patent No.: US 7,612,342 B1
(45) Date of Patent: Nov. 3, 2009

(54) VERY BRIGHT SCINTILLATORS

(75) Inventor: Vivek V. Nagarkar, Watertown, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 268 days.

(21) Appl. No.: 11/535,797

(22) Filed: Sep. 27, 2006

Related U.S. Application Data

(60) Provisional application No. 60/720,745, filed on Sep. 27, 2005.

(51) Int. Cl.
*G01T 1/20* (2006.01)
*H01J 23/34* (2006.01)
*H01J 29/10* (2006.01)
*G09G 3/20* (2006.01)

(52) U.S. Cl. ................... 250/362; 250/361 R; 250/367; 250/363.01; 315/1; 345/75.2; 313/461

(58) Field of Classification Search ................. 250/362, 250/361 R, 367, 363.01; 315/1; 345/75.2; 313/461
See application file for complete search history.

(56) References Cited

U.S. PATENT DOCUMENTS

| | | | |
|---|---|---|---|
| 4,208,577 A | 6/1980 | Wang | |
| 4,849,639 A | 7/1989 | Born et al. | |
| 5,021,705 A * | 6/1991 | Yamamoto et al. | 313/106 |
| 2002/0036286 A1 * | 3/2002 | Ho et al. | 257/11 |
| 2004/0051041 A1 * | 3/2004 | Todokoro et al. | 250/310 |
| 2004/0200972 A1 * | 10/2004 | Nam et al. | 250/370.11 |
| 2004/0232344 A1 | 11/2004 | Karplus et al. | |
| 2005/0023475 A1 * | 2/2005 | Li et al. | 250/370.09 |
| 2005/0056846 A1 | 3/2005 | Huang et al. | |
| 2005/0077811 A1 | 4/2005 | Sun et al. | |
| 2005/0231099 A1 * | 10/2005 | Hsu et al. | 313/496 |
| 2007/0069141 A1 * | 3/2007 | Nittoh et al. | 250/367 |

FOREIGN PATENT DOCUMENTS

GB   1 367 875   9/1974

OTHER PUBLICATIONS

Balcerzyk et al., "Search for Indium and Thallium Based High Density Scintillators," *IEEE Nuclear Science Symposium*, Lyon, France, 1:6-25-6-29 (2000).

(Continued)

*Primary Examiner*—David P Porta
*Assistant Examiner*—Mindy Vu
(74) *Attorney, Agent, or Firm*—Townsend and Townsend and Crew LLP

(57) ABSTRACT

The present application discloses methods and devices for increasing the light output of a scintillator. Using the methods of the present disclosure, a very high intensity electric field is applied to a scintillator exposed to ionizing radiation and provides light outputs that far exceeds those previously obtained in the art. The light output gains are very high, on the order of 10 to 100 times those obtained with prior methods, and will make it possible to achieve sufficient brightness to enable the use of a cathode ray tube or a field emission display in new devices. In the field of x-ray imaging, a bright scintillator will have tremendous potential in many important applications, such as computed tomography (CT), SPECT, diagnostic digital radiology, and the like.

65 Claims, 3 Drawing Sheets

OTHER PUBLICATIONS

Bartram and Lempicki, "Efficiency of Electron-Hole Pair Production in Scintillators," *J. Lum.* 68:225-240 (1996).

Blume, "Image Processing Strategies in Picture Archiving and Communication Systems," *J. Digit. Imaging* 12:43-47 (1999).

Derenzo et al., "The Quest for the Ideal Inorganic Scintillator," *Nucl. Inst. Meth. Phys. Res. A* 505:111-117 (2003).

Hayt et al., "Filmless in 60 Days: The Impact of Picture Archiving and Communications Systems within a Large Urban Hospital," *J. Digit Imaging* 14:62-71 (2001).

Henri et al., "Evolution of a Filmless Digital Imaging and Communications in Medicine-Conformant Picture Archiving and Communications System: Design Issues and Lessons Learned Over the Last Years," *J. Digit. Imaging* 12:178-180 (1999).

Huang, "Advances in Medical Imaging," *Ann. Intern. Med.* 112:203-220 (1990).

Korzhik and Lecoq, "Search of New Scintillation Materials for Nuclear Medicine Applications," *IEEE Trans. Nucl. Sci.* 48:628-631 (2001).

Mao et al., "New Types of Lead Tungstate Crystals with High Light Yield," *IEEE Nucl. Sci. Symp.-Med. Imag. Conf.*, Lyon, France, 1: 6-7-6-12 (2000).

Nagarkar and Tipnis, "Micro CT Scanners Incorporating Internal Gain Charge-Coupled Devices," U.S. Appl. No. 60/581,478, filed Jun. 21, 2004.

Nagarkar, "Combined Radionuclide and X-Ray Imaging Device," U.S. Appl. No. 60/581,400, filed Jun. 21, 2004.

Nagarkar, "Combined Radionuclide and X-Ray Imaging Device," U.S. Appl. No. 11/158,938, filed Jun. 21, 2005.

\* cited by examiner

VERY BRIGHT SCINTILLATORS

CROSS-REFERENCES TO RELATED APPLICATION

This application claims the benefit of priority under 35 U.S.C. § 119(e) of U.S. Patent Application No. 60/720,745, filed Sep. 27, 2005, the entire content of which is incorporated herein by reference.

BACKGROUND OF THE INVENTION

Over the years, the television tube has evolved to the point where it remains the source that provides the best overall picture quality. In the field of medical imaging cathode ray tubes (CRTs) offer tremendous advantage due to their superior dark level and speed of response which permit their use as a 3-D display. Also the low cost of CRTs compared to the other technologies makes them competitive, particularly when approaching the highest standards for high definition television. In spite of these advantages, CRTs are losing in the marketplace as television displays and projectors based on liquid crystal concepts, e.g., liquid crystal displays (LCDs), micro-mirror digital light processors, and plasmas have evolved in recent years. Similarly, field emission displays (FEDs), a breakthrough in imaging technology, have fallen out of favor in comparison to liquid crystal displays (LCDs) and plasma display technologies.

There have been substantial improvements in the development of all the primary components in the CRT/FED except for the cathodoluminescent phosphor. Improved phosphors could be applied to cathode ray tubes (CRTs) and field emission displays (FEDs) so that light output from these devices can be increased accordingly and serve to provide a much brighter display. The limitation of CRT and FED technologies arises from the current cathodoluminescent phosphors used in these devices. These phosphors limit the display brightness due to their low output, reduced contrast due to their amorphous structure, and need for high voltage across the tube for their operation.

The FED operates by a video controlled array of micro beams so as to simultaneously project electrons across a narrow space to impact a cathodoluminescent phosphor causing light emission and display. The concept for the FED caused substantial excitement because there was a very real potential for creating a truly superior image at reasonably cost. Also, the United States Government has invested substantial amounts of money in FED development since it represented not only a breakthrough in imaging technology, but also because it created an opportunity to bring the manufacture of video displays back to the United States. As with CRTs there have been substantial improvements in the development of all the primary components in the FED except for the cathodoluminescent phosphor. Improvements in the technology are needed or are required to improve the production of a bright image with a lower energy beam. Currently, an energy of at least 10 keV is required to produce an image for even a limited number of device applications.

In the medical diagnostics field "Totally Digital" and "Film-less Radiology" is rapidly replacing the conventional film-screen based radiology (Henri et al., *J. Digit. Imaging* 12:178-180, 1999; Hayt et al., *J. Digit Imaging* 14:62-71, 2001; Huang, *Ann. Intern. Med.* 112:203-220, 1990; Blume, *J. Digit. Imaging* 12:43-47, 1999). Digital imaging sensors and digital displays are used instead of the traditional sensor and display, typically comprising the film-screen combination and the associated film-light box. In digital x-ray imaging systems, the functions of image detection and image display are separated and the images can be presented to the human observer at optimum information transfer, i.e., after contrast and spatial frequency response enhancement. In fact, the availability of efficient software permits presentation of the information according to a display function standard such that the images appear practically at identical gray scales anywhere the same or similar display software is used. This fidelity of image presentation increases the consistency and accuracy of diagnosis. However, as advanced as the acquisition devices are, displaying these digital images still presents a challenge. Presently the CRT is considered the most mature electronic display available, thus it is the primary candidate to display digitally acquired radiographs and mammograms, despite the fact that its performance is still not adequate. Most high performance CRTs can display images with matrix sizes of 2048×2560. An advantage of CRTs is their superior dark level, which cannot be matched by that of LCDs. Another advantage of CRTs is their high response speed, which permits their use for 3-D information and dynamic displays. Due to their slow response, LCDs cannot perform this function as efficiently. Nevertheless LCDs compete with CRTs in the market place.

Usually the environment in a radiograph reading room is characterized by subdued lighting, but the performance of the radiologist is improved by high maximum display luminance. Typical maximum luminance values range around 400 cd/m$^2$, however recent efforts are being directed toward achieving a maximum luminance of about 2100 cd/m$^2$. Furthermore, in countries like Japan, radiologists typically read radiographs in brightly lit rooms, which require displays reaching even higher maximum luminance values. Thus, a need exists for higher luminance displays.

Bright scintillators are also needed for imaging ionizing radiation. The charged particle and x-ray/gamma-ray imaging community is particularly interested in new fast scintillators with high density and high light output for applications in nuclear medicine such as single photon emission tomography (SPECT) (Korzhik and Lecoq, "Search of New Scintillator Materials for Nuclear Medicine Applications", IEEE Nuclear Science Symposium-Medical Imaging Conference, Lyon, France, 2000), computed tomography (CT), diagnostic x-ray imaging (Qu et al., "A Search for a New Type of Lead Tungstate with High Light Yield", IEEE Nuclear Science Symposium-Medical Imaging Conference, Lyon, France, 2000; Balcerzyk et al., "Search for Indium and Thallium based High Density Scintillators, IEEE NSS-MIC Conference, Lyon, France, 2000). Many important applications such as macromolecular crystallography and high-speed imaging are "light starved" and need converters with significantly higher light yield (output) than is currently possible. Also, many applications require that integrating detectors (such as a charge-coupled device (CCD) or a hydrogenated amorphous Silicon (a-Si:H) flat panel array) detect a single x-ray or gamma-ray photon. While it is possible to achieve such a sensitivity using very highly sophisticated CCD arrays, they are prohibitively expensive. Higher light output would improve the image signal-to-noise ratio (SNR) and provide images with superior quality than are currently possible.

It is known that a-Si:H flat panel detectors have a problem of read noise. Noise can not be reduced, so the common approach is to attempt to increase the signal to maintain a high SNR. To achieve this, the current thinking is to introduce a signal amplification stage within the flat panel. This is not only expensive, as new fabrication lines will have to be developed, but it is not yet known if the additional electronics will introduce additional noise. Also, there are concerns about the dynamic range of such a device. Higher light output obviates these problems.

The methods and devices of the present invention provide for an increased light output or luminescence that solves many of the current deficiencies in the scintillators used in video displays, as well as radionuclide and x-ray imaging devices.

BRIEF SUMMARY OF THE INVENTION

The present application discloses methods and devices where under the application of a very high intensity electric field, a scintillator exposed to ionizing radiation can provide light outputs that far exceeds those previously obtained in the art. In a particular embodiment of the invention a light output gain on a scale of magnitudes has been achieved from a thick single crystal scintillator film as compared to that previously achieved with a "state-of-the-art" cathodoluminescent phosphor powder or a scintillation crystal. The light output gains are on the order of 10 to 100 times those obtained with prior methods, and will make it possible to achieve sufficient brightness from, for example, an FED for it to serve as a digital video projector. In the field of x-ray imaging, such a bright scintillator will have tremendous potential in many important applications, such as computed tomography (CT), SPECT, and diagnostic digital radiology.

In one embodiment of the present invention a CsI(Tl) scintillator structure is provided that can achieve a large gain in luminescence, light yield, from a thick scintillator film or scintillator crystal, when under the influence of an intense internal electric field. The film can be in the form of a thick crystalline slab of a scintillator such as for example, CsI(Tl), or in the form of a microcolumnar structure to achieve the required gains. A device comprising the scintillator and an assembly for attaching a plurality of opposed electrodes is combined with an ionizing radiation source and alternatively an optically coupled light detector.

Thus, in one aspect the present invention provides a method to obtain luminescence gain from a scintillator. Such a method includes providing a scintillator and applying an electric field to the scintillator so as to increase luminescence output of the scintillator during radiation detection.

In another aspect, the present invention provides a device to obtain luminescence gain from a scintillator by application of an electric field to the scintillator. The device includes a scintillator and an assembly for coupling a plurality of electrodes to the scintillator so as to provide an electric field to the scintillator to increase luminescence output of the scintillator during radiation detection.

In yet another aspect, a radiation detection device that obtains luminescence gain from a scintillator by application of an electric field to the scintillator is provided. The device includes a scintillator, a plurality of electrodes coupled to the scintillator so as to provide an electric field to the scintillator to increase luminescence output of the scintillator during radiation detection, an energy source coupled to the plurality of electrodes to provide the electric field to the scintillator, and an optically coupled photodetector to detect luminescence released from the scintillator.

In another aspect, the present invention provides multilayered devices and assemblies, including a multi-layered device for obtaining luminescence gain from a scintillator by the application of an electric field to such scintillator. Such a device includes an assembly comprising a plurality of scintillator layers, each scintillator layer of the plurality disposed between a pair of electrode layers, the electrode layers coupled to the scintillator layer so as to provide an electric field to the scintillator layer to increase luminescence output of the scintillator layer during radiation detection. The assembly can include a single electrode layer disposed between adjacent scintillator layers.

Devices and assemblies of the present invention can be combined with or incorporated into a variety of devices making use of scintillation based radiation detection. For example, in another aspect of the present invention, a cathode ray tube (CRT) device is provided. The device includes a cathode ray tube, a scintillator coupled to a face of a CRT substrate, and an assembly for coupling a plurality of electrodes to the scintillator so as to provide an electric field to the scintillator to increase luminescence output of the scintillator during radiation detection. The device further includes an energy source coupled to the plurality of electrodes to provide the electric field to the scintillator, and an activated electron source.

In yet another aspect, the present invention provides a Field Emission Display (FED) device. The device includes a scintillator, an assembly for coupling a plurality of electrodes to the scintillator so as to provide an electric field to the scintillator to increase luminescence output of the scintillator during radiation detection, an energy source coupled to the plurality of electrodes to provide the electric field to the scintillator, a video controlled array of microbeams that provide an array of electrons aimed to strike the scintillator, and a display substrate.

In another aspect of the present invention, a flat panel x-ray detector device is provided. The device includes a scintillator, a plurality of electrodes, an assembly for coupling the plurality of electrodes to the scintillator so as to provide an electric field to the scintillator to increase luminescence output of the scintillator during radiation detection, an energy source coupled to the plurality of electrodes to provide the electric field to the scintillator, an x-ray source, a flat panel light detector optically coupled to the scintillator.

In another aspect, the invention includes methods of performing radiation detection. The method includes providing a device according to the present invention and positioning a target or detection source (e.g., radiation source) within a field of view of the scintillator as to detect emissions from the target or source. Emissions detected according to the invention methods can include, for example, gamma-rays, x-rays, electrons, and the like. Targets or detection sources can include any source of detectable signal. In some embodiments, such as imaging applications, an object (e.g., patient) is positioned between the radiation source and the scintillator of the device.

For a fuller understanding of the nature and advantages of the present invention, reference should be made to the ensuing detailed description and accompanying drawings. Other aspects, objects and advantages of the invention will be apparent from the drawings and detailed description that follows.

DETAILED DESCRIPTION OF THE INVENTION

Figure 1:
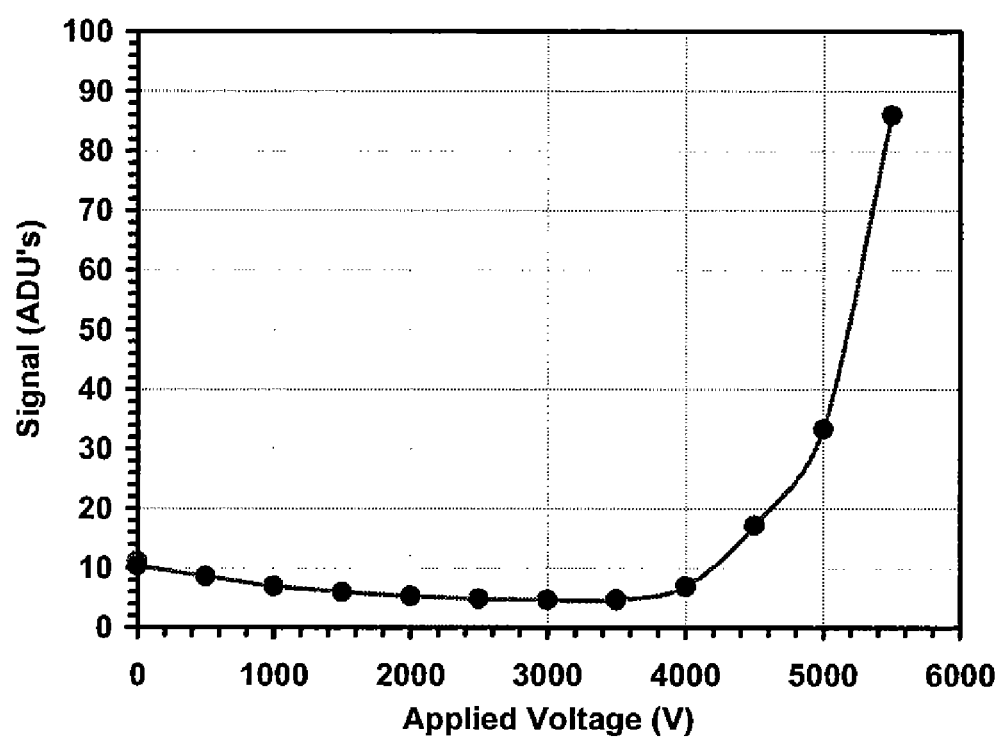
FIG. 1 provides data showing approximately an order of magnitude gain in luminescence from a thick film of CsI(Tl) when under the influence of an intense internal electric field. There occurs an impressive increase in light output. The light output gain can be controlled by varying the applied voltage.

This invention will be better understood with resort to the following non-limiting definitions:

A. A scintillator, including scintillator film or scintillator crystal, includes a substrate, e.g., a film or crystals of a substance, that absorbs high energy (ionizing) electromagnetic or charged particle radiation then, in response, fluoresces photons at a characteristic Stokes-shifted (longer) wavelength, releasing the previously absorbed energy. Examples include inorganic scintillators such as cesium iodide activated by thallium (CsI(Tl)), cesium iodide activated by sodium (CsI(Na)), sodium iodide activated by thallium (NaI(Tl)), zinc sulfide and oxide (ZnS and ZnO), yttrium aluminum perovskite activated by cerium (YAP(Ce)), yttrium aluminum garnet activated by cerium (YAG(Ce)), bismuth germinate (BGO), calcium fluoride activated by europium (CaF(Eu)), lutetium aluminum garnet activated by cerium (LuAG(Ce)), gadolinium silicate doped with cerium (GSO), cadmium tungstate ($CdWO_4$; CWO), lead tungstate ($PbWO_4$; PWO), double tungstate of sodium and bismuth ($NaBi(WO_4)_2$; NBWO), zinc selenium doped with tellurium (ZnSe(Te)), lanthanum bromide activated by cerium ($LaBr_3(Ce)$), cerium bromide ($CeBr_3$), lanthanum chloride activated with cerium ($LaCl_3(Ce)$) and the like.

B. Luminescence shall mean the number of light photons produced per unit energy deposited by a detected energetic electron, typically the number of light photons/keV or light photons/MeV. Luminescence is used herein interchangeably with the term "light output". Typically, various display technologies used in the art provide a maximum luminescence of about 400 $cd/m^2$. Research is currently underway at various institutions to find ways to increase the luminescence of optical displays up to about 2100 $cd/m^2$. "Luminescent gain" is used herein to describe a comparison of the luminescence of a particular scintillator under conditions typically used in the art and the luminescence of the same scintillator under other conditions, such as the condition disclosed in the present invention. Using the devices and methods described herein an increase in the number of optical photons are released per absorbed high energy particle (x-rays or gamma-rays) providing an increase in light output for the scintillator.

C. Thick film shall mean a layer of scintillator capable of stopping (or absorbing) almost 100% of the incident radiation. A thick film can be from about 30 μm to about 5 mm or even thicker depending on the scintillator used and the energy of the incident radiation. Typically, the scintillator film is about 300 μm thick when CsI(Tl) is used for imaging about 10 keV electrons, and is about 500 μm thick when used for detecting x-rays in diagnostic imaging (140 kVP x-rays). When used for imaging gamma-radiation of about 100 keV or above a CsI(Tl) film of about 2 to 5 mm is used.

D. A very high intensity or intense electric field shall mean from about 500 Volts up to about 5,000 Volts across the film The electric field intensity will then vary depending on thickness. For example, 5,000 Volts across a 300 μm thick film will result in an electric field of about 167,000 Volts/cm.

E. Brightness shall mean the number of photons released by the scintillator in response to interaction with an energetic electron.

High efficiency shall mean the percentage of energy particle emissions, such as electrons, x-rays, alpha particles, and the like, absorbed within the scintillator will be greater than 90%. Efficiency as used in this context means the stopping power of the scintillator and is dependent on the density, atomic number, and thickness of the scintillator. Typically, a stopping power of about 90% or greater is considered high efficiency, and about 70% or lower is considered a low efficiency.

The present invention relates to luminescence or release of a photon from a scintillator film or from a scintillator crystal when under the influence of an intense internal electric field. The luminescence can be stimulated by energetic electrons from, for example, an ionizing radiation source such as an electron gun as used in a cathode ray tube or from a beta emitting radioactive source. Energetic electrons from these sources stimulate the normal luminescence in the scintillator. However, when an intense electric field is applied across the scintillator simultaneously with exposure to the energetic electrons, the present methods and devices clearly demonstrate a 10 to 100 times, or more increase in light output.

A study of the history of research carried out to improve the efficiency and mechanisms for gain of light output in thin scintillator films, shows a failure to provide the desired results. It became clear that a more likely approach for success would have to be in another direction, such as with thick scintillator films. Thick scintillator films or crystals do not suffer from the disadvantages of thin films, especially that of not having enough drift space for electrons, thus limiting the multiplication gain in light output. Thick scintillator films and crystals offer an opportunity to achieve light output gains with mechanisms not explored heretofore as identified in the present invention.

A particular embodiment of the present invention demonstrated that substantial light output gain could be achieved with a thick scintillator film. For example, a 300 micron thick CsI(Tl) film was grown and coated with electrodes that permitted the application of a potential difference across the film. The potential difference applied was sufficient to create an intense, internal electric field in excess of 100,000 Volts/cm. The applied voltage began with a few volts and was increased gradually up to 5,000 Volts (167,000 Volts/cm). Increasing the potential difference beyond 5,000 Volts was noted to initiate voltage breakdown in the scintillator film structure. In an demonstration of the method of the invention, the scintillator film was exposed to beta radiation from a 85 Kr source emitting 672 keV endpoint energy electrons. The beta radiation resulted in luminescence (light) emission as expected. The electric field was then applied beginning at a very low voltage. Initially, there was a diminution in the amount of light emission, which diminution existed until about 3,000 Volts. At that point, a further increase in voltage resulted in an increase in the light output. As the voltage was increased further, there was a substantial increase in light emission, until the voltage approached 5,000 Volts where the increased emission seemed to be growing in almost an exponential manner. Beyond 5,000 Volts, there began to be evidence of voltage breakdown and the demonstration was stopped. The experiment was carried out on two different thick films with the same results (FIG. 1). It should be noted that the electric field can be varied or selected to achieve a desired level of amplification and that the field can be temporally a substantially constant field.

Figure 2:
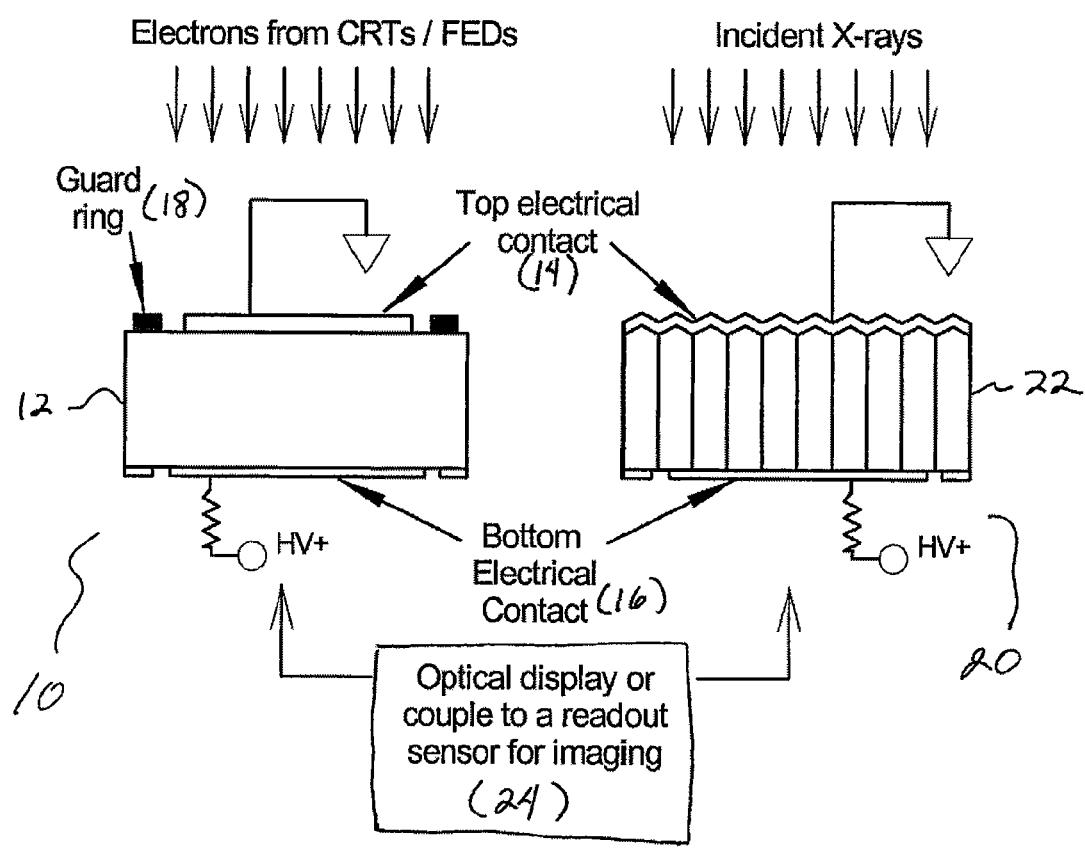
FIG. 2 provides a schematic of a high gain scintillator configuration.

As can be appreciated from FIG. 2, variants of the initial configuration are contemplated. FIG. 2 illustrates separate devices according to exemplary embodiments of the present invention. Referring to FIG. 2, a device 10 is provided for obtaining luminescence gain from a scintillator 12. The device 10 includes a scintillator with opposing top and bottom sides. The device 10 includes electrical contacts 14, 16 coupled to the opposing top and bottom sides of the scintillator 12, and a guard ring 18 on the top side of the scintillator 12. The electrical contacts can include electrodes or a portion thereof, or an assembly or component of an assembly for coupling electrodes to the scintillator according to the present invention. The device 10 can include an energy source electrically coupled to electrodes to provide an electric field to the scintillator. In use, an electric field is applied to the scintillator so as to increase luminescence output of the scintillator as a result of electrons from an activated electron source (e.g., CRT, FED) reaching the scintillator. Further illustrated in FIG. 2 is device 20, including a scintillator 22 (e.g., microcolumnar scintillator) having a top side substantially opposite a bottom side. The device 20 includes an electrical contact 14 coupled to the top side of the scintillator 22, and electrical contact 16 coupled to the bottom side of the scintillator 22. Device 20 can include an energy source electrically coupled to the electrodes 14, 16. In use, an electric field is applied to the scintillator to increase luminescence output of the scintillator during detection of radiation from a radiation source. A device 10, 20 of the invention can be viewed directly or optically coupled to a detector 24, such as an optical display or readout sensor (e.g., screen, photodetector, etc.) for visualization and/or analysis of scintillator 12, 22 luminescence.

Various electrode compositions and arrangements suitable for applying an electric field to the scintillator as to increase luminescence output of the scintillator during radiation detection will be available. For example, electrodes can be deposited directly on a surface of the scintillator or indirectly coupled to the scintillator. In one embodiment, for instance, the electrodes through which the high electric field is applied can be directly deposited on the scintillator material, by vacuum deposition, painting or gluing. In another embodiment, the electrodes can be physically separated by a dielectric such as a gas (air, dry nitrogen, inert gas), liquid or solid layer. Further, electrodes can be coupled to a scintillator by way of an attachment assembly. For example, a scintillator (e.g., a thick scintillator film or crystal) can be provided with an assembly or attachment element for connecting the electrodes to a device capable of providing the potential difference. In one embodiment, an attachment assembly can include electrical contacts or pads coupled to the scintillator and attachable to electrically conductive wires or leads that can be coupled with an energy source. An attachment assembly can include a minimal structure that provides electrical coupling between an electrode or portion thereof and a scintillator, or can include a more elaborate structure or housing that can be coupled to the scintillator. Numerous embodiments will be available.

The electrodes can be a continuous or a patterned conductor to provide spatial resolution within the scintillator. Specific patterns can be individual elements on a rectangular configuration, isolated electrically from each other, or orthogonal grids on opposite faces, forming an x,y coordinate system of electrically isolated elements. Other isolation patterns (circular, triangular) can be found and are described in, for example, US 2004/0232344 A1. The electrodes can be a continuous resistive layer so that the position of the fast displacement current produced by the electron-hole pairs within the scintillator can be identified by an identification assembly through resistive charge division. Similarly, other position readout schemes can involve capacitive or inductive coupling, delay lines or individual element readouts (See, for example, US 2004/0232344 A1). The electrodes can comprise a guard ring and they can also extend in from the border of the scintillator. With spatial resolution, the site of interaction may be detected for the purpose of imaging and for improving time resolution in time-of-flight PET cameras.

The necessary electric field can also be built up by an electron beam, such as that used for scanning on a CRT face, impinging on the scintillator. If the scintillator is an insulator, charge will build up on its surface, creating an electric field in the scintillator. Controlling the magnitude of this field would be more difficult than controlling the voltage applied to an electrode.

In another embodiment, detector devices and assemblies of the present invention can include additional optics for receiving and transmitting light from the scintillator to one or more optically coupled detectors (e.g., photodetectors). Light receiving and transmitting optics can include, for example, fiber optic elements, lenses, mirrors, and the like.

The above results lead to a consideration of mechanisms that explain the observed effects: the initial light loss and the subsequent dramatic improvement in light output. Without being bound to any particular theory underlying the invention, the inventors believe that the following discussion may explain the mechanisms that result in the characteristics of the scintillators as provided by the present invention. The diminution of light effect below 5,000 Volts seems to relate to a kind of polarization effect, while the light output gain seems best explained by impact excitation of the dopant (in this case, the Tl ion) by electrons.

Effects of an electric field on CsI(Tl) performance: To understand the present invention, it is first necessary to summarize the current understanding of mechanisms involved in generating light output from a scintillator, such as CsI(Tl). The luminescence released by CsI(Tl) is known to have a short time component with a time constant of about 200 ns. There is also an intermediate time component and a long time component whose time constants in the alkali halides extends out to as long as 200 ms. The long time constants can provide a considerable fraction of the total light output. The explanation for these different effects has been described on the basis of trapping mechanisms for free electrons and trapped holes at thallium sites (the dopant), the mobility of self trapped electrons and self trapped holes at thallium sites, thermal detrapping and recombination of these charge carriers.

The Light Diminution Effect: A possible explanation for light diminution can be based on the effect of the electric field on these charge carriers. The normal mechanisms for light emission are based on thermal random processes whereby electrons and holes in and out of traps within the scintillator are expected to diffuse randomly in all directions. Thus by chance they recombine at thallium (dopant) sites with the emission of light whose characteristics exhibit different time constants and broad band emission depending upon trap depth, mobilities and energy states available for excitation and recombination in the thallium (dopant) ions. The application of an intense electric field upsets these normal thermal based mechanisms in that electrons, holes and mobile traps are encouraged to drift in opposite directions toward the positive or negative electrode, as determined by their negative or positive charges, respectively. Thus the probability of their normal movements is diminished. It seems reasonable that there should be less light output with the application of the electric field since the excitation of the Tl (dopant) ion must be clearly diminished.

The increase in light output and the proposed mechanism for light output gain: As the electric field increases, there comes a point where it becomes possible for free electrons to gain sufficient energy to cause internal impact excitation of luminescence. This process is assumed to be multiplicative in that each time the electron gives up its energy to excite a higher energy state, it becomes thermalized and available for reenergizing by the electric field, leading to subsequent impact excitation at another site. Thus this can happen many times as the electron passes through the thickness of the scintillator film on its way to the positive electrode.

The following theoretical treatment should provide some estimates of anticipated performance, but is not intended to limit the invention in any manner:

The internal electric field applied to the 300 micron scintillator crystal for the applied 5,000 Volts is $E$=5,000 Volts/0.03 cm=167,000 Volts/cm The distance that an electron travels through the crystal between collisions and causing impact excitation can be estimated from the following steps.

The yield from CsI(Tl) is 64,000 photons/MeV. Conversely, energy per photon=1,000,000 $eV$/64,000 photons=15.6 $eV$ per photon.

This represents a conservative estimate of the impact energy required for the excitation of the Tl ion to luminesce.

The relationship between the field strength E, the energy required/acquired for impact excitation V, and the distance in which this energy is acquired is given by:

$V=E \times d$, where E is the field strength=167,000 Volts/cm, V is the energy required to generate a photon=15.6 eV, and d is the distance traveled between impacts. We find then, d=0.934 microns. With this it is possible to estimate a measure of gain. This can be managed by determining the average number of possible impact excitations that can cause the emission of light. Gain can be estimated by dividing the thickness of the scintillator film by the average distance traversed by the electron between collisions.

Gain=300 microns/0.934 microns=321.

The time T required by an electron to pass through the thickness D of the film is a measure of the speed of excitation. This can be calculated from $T=D/\{\text{electron mobility } (\mu) \times \text{field strength } (E)\}$=3.90 nanoseconds, where $\mu$=46 cm$^2$/(Volt sec); D=0.0300 cm; E=167,000 Volts/cm This is a measure that applies appropriately for electrons injected within a micron or two of the input surface adjacent to the negative electrode, typically for the relatively low beam energies used in a cathode ray tube, i.e., less than 25 keV. The 600 keV beta electrons penetrate farther into the crystal with the consequence being a lower light output gain and an average lesser time to pass through the crystal.

The speed of response however depends upon the time it takes for the Tl ion (dopant ion) to return to the ground state while under the influence of the intense electric field. In the case of CsI(Tl), the speed of response for the field free case is known to have an early time process (680 ns), intermediate long time processes (3.6 μs), and a long time processes (which lasts about 2 ms). Thus the time for excitation of 390 ns cannot be a significant factor compared to the decay (recombination) time, and is suitable for generating a very rapid luminescent rise time. If in fact, the electric field induced response does lead to a time constant characteristic of the early time process, it would lead to CsI(Tl) being applicable to new areas such as medical CT, homeland security, nondestructive testing and high speed radiographic imaging.

It should be noted that the increase in light output (the number of optical photons/unit energy) was achieved with high conversion efficiency. This was expected because the methods make use of a very high resistivity material where the dark current was extraordinarily low, and the light output gain that was obtained was due to the injection electrons. In fact it has to be so low that there was no light emission from the dark current, i.e., before the injection of electrons. Thus, the only extra current was provided by the injection electrons, which disappear at the positive electrode. It is important to appreciate the low power consumption generated within this thick scintillator film. The sample film was approximately 2.5×2.5 cm$^2$ square and its measured resistivity was 1.68×10$^{17}$ ohm cm. The measured resistance of the 300 μm thick scintillator film was 1.126×10$^{15}$ ohms. The dark current was 4.4×10$^{-12}$ amps and the power expended with the 5,000 Volts applied to the scintillator film was approximately 3.4 nW/cm$^2$.

Nevertheless, for an efficiency of conversion of incoming energy to electrons of 15.6 eV, and even just a light output gain of 10, the conversion efficiency was approximately 1.6 eV/electron, which is comparable to the best semiconductors. Thus, a displacement current was produced that was detectable with present day electronics. This current can be used to measure deposition energy and position of interaction in single photon detection.

Light Output Gain: CRT and FED tubes suffer from a common ailment. They require much more light output for most of their applications. The CRT is losing marketplace to LCD, DLP and Plasma based displays (and projectors) in large part because the displays are much brighter. The loss of market share is occurring in spite of the fact that CRT's provide a superior black level and overall picture quality. The high light output gain provided by a specific embodiment of the present invention, CsI(Tl), has the potential for providing the bright light level required to make the CRT and the FED competitive in the present day marketplace. This is based on the following simple analysis using CsI(Tl) as an example scintillator. The light output yield for CsI(Tl) is equal to 64,000 photons/MeV. It is assumed that the mechanism for generating each photon involves an electron, either through the generation of electron-hole pairs or through direct excitation of the thallium ion. Thus the yield also provides a yield of 64,000 internal electrons/MeV.

This result has suggested an immediate application of CsI(Tl) to the CRT and FED. If the method of the present invention were used to construct a CRT and assuming a 10 keV electron from a cathode tube gun strikes the CsI(Tl) surface serving as the tube's phosphor target, this would cause the generation of 640 internal electrons within a micron of the thick scintillator film's surface. The initial electron striking the surface causes the usual luminescence. However, the inner electrons after participating in luminescence processes which would usually drain back to the electrode to maintain charge neutrality, using the methods of the present invention would move in the opposite direction to a positive electrode when under the influence of the intense electric field. Along the way the electrons experience 320 opportunities for collision excitation to stimulate field enhanced luminescence. Every other electron in the electron beam provides the same performance. In theory, this could cause an increase in net light output by as much as a factor of 320. This is far more than is needed, even for a projector tube. The disclosed CsI(Tl) thick film embodiment of the present invention offers an opportunity to reduce the energy required from 10 kilo Volts to about 2 to 3 kilo Volts while dramatically increasing the light output. In effect the required high voltage (10 keV) across the vacuum space of an FED is reduced to 2 to 3 keV, and transfers the high voltage requirement to an application across the thick scintillator film. Thus, there is a substantial reduction in the energy required to operate the device. In the case of the FED, the potential difference across the vacuum space can be reduced by a factor of two or more, while electrons impacting the CsI(Tl) surface will still have sufficient energy to generate adequate light output.

The development of video controlled imaging sources began roughly in the 1930s when research and development was being vigorously pursued to establish practical, commercial television. Over the years, these television tubes have evolved to the point where they remain the source that provides the best overall picture quality. However, they are losing in the marketplace as television displays and projectors have evolved based on liquid crystal concepts, micro-mirror digital light processors, and plasmas. Nevertheless, the cost of CRTs compared to the other technologies makes then price competitive, particularly when approaching the highest standards for high definition television. The evolution of the CRT based on the disclosed CsI(Tl) thick film technology is expected to operate with substantially reduced voltages and currents, and improve its operating efficiency in excess of 50%. This performance will be accompanied by extraordinarily controlled bright images for the home. It is also anticipated that it will become the dominate projector for the home and cine theater for very high definition TV. Such projectors exists in 7" and 9" diameter tubes and already are able to provide 2000 and 3000 TV line rasters.

The evolution of the CRTs/FEDs based on the disclosed CSI(Tl) thick film is expected to operate with substantially reduced voltages and currents while improving its operating efficiency at least by 50%. This performance will be accompanied by controlled, extraordinarily bright images. Furthermore, the use of microcolumnar scintillators, such as CsI(Tl), can provide an additional advantage of light channeling within the scintillator film structure, thereby significantly improving the resolution and contrast in a displayed image. With the extraordinarily high gains expected from the proposed design, a CsI(Tl) scintillator can serve as a digital video projector for the home and cine theater for very high definition TV.

In additional embodiments using the methods of the present invention, x-ray and gamma-ray detection can be accomplished with greater efficiency. The x-ray/gamma-ray imaging community is particularly interested in new fast scintillators with high density and high light output for applications in nuclear medicine, such as single photon emission tomography (SPECT) (Korzhik and Lecoq, "Search of New Scintillator Materials for Nuclear Medicine Applications," IEEE NSS-MIC Conference, Lyon, France, 2000), computed tomography (CT), diagnostic x-ray imaging (Qu, et al., "A Search for a New Type of Lead Tungstate With High Light Yield," IEEE NSS-MIC Conference, Lyon, France, 2000; Balcerzyk, M., et al., "Search for Indium and Thallium based High Density Scintillators," IEEE NSS-MIC Conference, Lyon, France, 2000). Thus, in addition to the display technologies, the proposed methods are expected to have a substantial impact on various radiation imaging modalities. The market for novel displays and digital radiation detectors is in hundreds of millions of dollars per year. Configurations for devices using the methods of the present invention can be essentially the standard configurations with the replacement of the scintillator assembly of the present invention comprising the scintillator with an attachment assembly for a plurality of opposed electrodes and a source to provide an electric field through the electrodes and across the scintillator. See the following disclosures for examples of recent configurations for various detectors: U.S. patent application Ser. Nos. 60/581,478, filed Jun. 21, 2004; 11/158,918, filed Jun. 21, 2005; 60/581,400, filed Jun. 21, 2004; and 11/158,938, filed Jun. 21, 2005, the disclosures of which are incorporated herein by reference.

While a wide variety of new scintillators are now available, CsI(Tl) remains a highly desired material due to its excellent properties, low cost, and easy availability (Saint-Gobain Ceramics & Plastics, Inc.). Having the highest conversion efficiency of any known scintillator (64,000 photons/MeV) (Bartram and Lempicki, J. Lum. 68, 225-240, 1996), a rapid initial decay (680 ns), and an emission in the visible range (540 nm), CsI(Tl) has found extensive use in nuclear and medical imaging applications (Rodnyi, "Physical Processes in Inorganic Scintillators," CRC Press, Boca Raton, N.Y., 1997; Knoll, "Radiation Detection and Measurement," Second Edition, John Wiley & Sons, 1989), Furthermore its high density (4.53 g/cc), high atomic number (Z=54), and transparency to its own light have made it a material of choice for gamma ray imaging. For new designs of ultrahigh resolution displays and imaging systems, CsI(Tl) offers another important advantage in that it can be grown in a micro-columnar structure, which preserves spatial resolution and improves image contrast via total internal reflection. One of the most critical advantages of CsI(Tl) is that it offers very high resistivity in the range of $2 \times 10^{17}$ ohm-cm. This makes it possible to substantially reduce the power requirement while achieving very high luminescence gains.

Penetrating radiation: As can be appreciated, the gain in light output is dependent on the distance the electron travels under the influence of the electric field and before it is trapped. In a very thin scintillator, or one where the incident radiation is absorbed near the negative electrode, the gain is substantially uniform. In the case of a very thick detector and penetrating radiation, the gain will vary for different interaction depths. When the incident beam fluence is high, linearity of response is preserved, since the average energy deposited by many incoming particles is averaged. In the case of low fluence, specifically, single-particle counting, the light output will vary significantly depending on interaction point. There are various mechanisms known in the art that can be used to ameliorate these effects.

Figure 3:
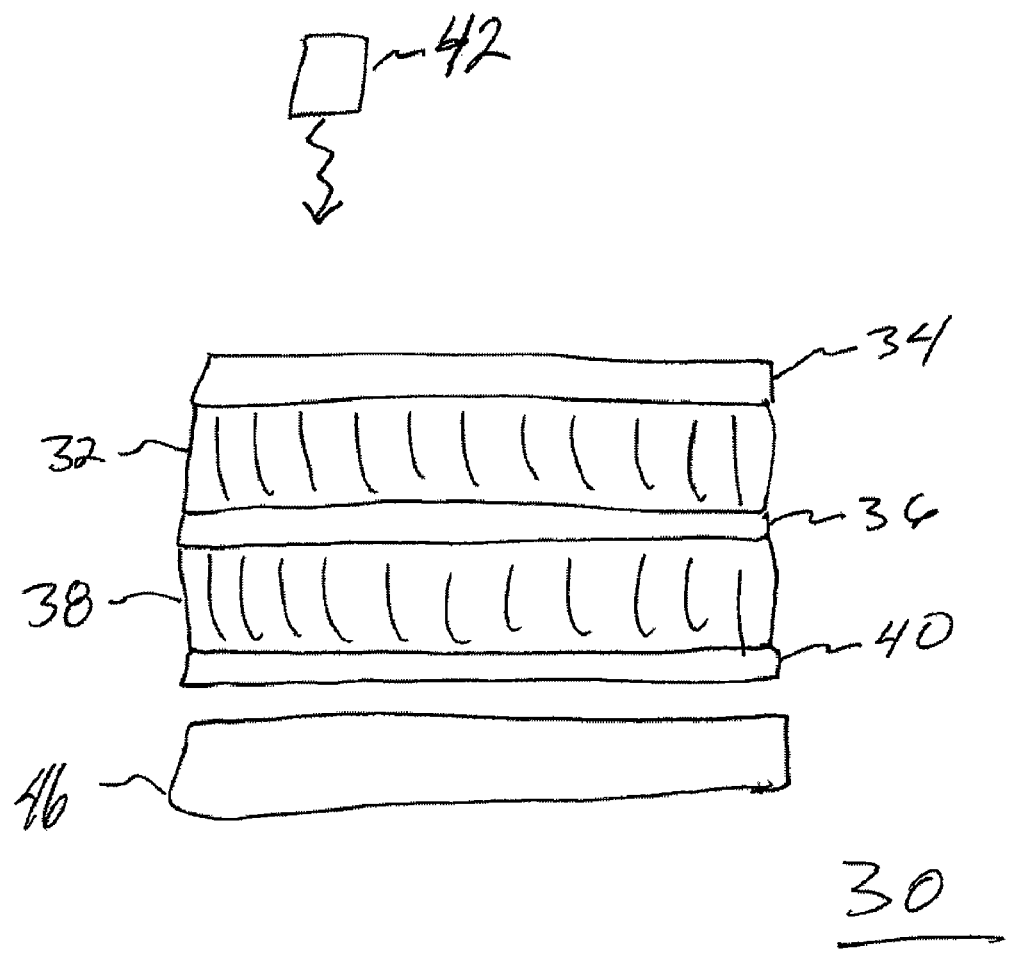
FIG. 3 illustrates a multi-layer or multi-module device according to an embodiment of the present invention.

The very thick detector can be assembled from thinner modules that are stacked. A multi-layer device or device comprising an assembly of stacked molecules is described with reference to FIG. 3. The device 30 includes a first scintillator layer 32 disposed between electrode layer 34 and electrode layer 36. The device further includes scintillator layer 38 disposed between electrode 36 layer and electrode layer 40. In use, electrode layers 34, 36, 40 provide an electric field across scintillator layers 32, 38 and increase luminescence output of the scintillator layers 32, 38 during energetic photons or electrons emitted from a radiation source 42. Thus, each scintillator layer of a multi-layer device will be disposed between or "sandwiched" by opposing electrode layers. The device 30 can further include an optically coupled detector 46, such as a photodetector. A device can include modules and/or layers (e.g., scintillator layers, conducting layers, transparent layers, etc.) in addition to those illustrated in FIG. 3.

Various configurations and arrangements of stacked or multi-layer or multi-module devices are included in the present invention. In one embodiment, modules may have individual photodetectors or the electrodes may be substantially transparent to light. Depending on the type of device the photodetector can be a photodiode, a photomultiplier, or an avalanche diode. The voltage can cascade across electrode pairs (this allowing for information as to which scintillator has been activated), or ground and high voltage electrodes can be alternated so as to keep the maximum voltage lower than in a cascade. A single photodetector can be applied, optically coupled through transparent electrodes or to the sides of the scintillator not facing the electrodes. As an alternative, CsI and other scintillators can be grown in layers with deposits of transparent conducting layers between each two layers of scintillator. Materials for use as a transparent conducting layer are well know in the art and can include a transparent oxide layer, a transparent thin metal layer, a transparent metal nitride layer, and the like. The transparent oxide layer can comprise, for example, ITO, ZnO, $IN_2O_3$, $SnO_2$, and the like. The transparent thin metal layer can be comprised of Ti, Zr, Hf, Nb, Ta, Cr, Mo, W, Co, Mi, Pd, Pt, Ir, Ru, Rh, Cu, Ag, Au, Al, and the like. The transparent metal nitride layer can comprise, for example, a transition metal nitride (TMN), a TMN containing aluminum ($TM_xAl_{(1-x)}N$), a TMN containing gallium ($TM_xGa_{(1-x)}N$), a TMN containing indium ($TM_xIn_{(1-x)}N$), and the like. Additional examples of materials suitable for use as a transparent conductive layer are well known in the art.

Detectors can be built to have non-uniform electric fields, so as to have weaker fields for those electrons that can travel the longest distance.

Another alternative is to impose an alternating field on the scintillator. The field can be a truncated sine wave or a square pulse of alternating polarity. By making the period of this pulse shorter than the travel time of the electron through the material, most electrons are allowed to be captured in the scintillator rather than at the electrodes, so that a substantial number of electrons have the opportunity to undergo the same number of light amplification interactions. Typically, the alternating frequency used is in a range of about 100 to about 1000 MHz. For restricting the electrons to a 300 µm travel distance, the alternating frequency can be in the range of about 250 MHz.

In one exemplary embodiment of the present invention the thick scintillator film of the present invention comprising attachment elements for the plurality of electrodes can be constructed as a CT scanner system. The CT scanner system will generally comprise a source of penetrating radiation (e.g., x-ray source—typically an x-ray tube), an assembly for either rotating the x-ray source around the subject or for rotating the subject; a detector assembly; associated processing electronics; and a computer and software for image reconstruction, display, manipulation, post-acquisition calculations, storage and retrieval. The detectors may either be stationary or the detectors may be rotating. Alternatively, the CT system may include means to rotate a subject placed within the imaging volume and the CT assembly would then remain fixed in space.

The detector assembly uses a two-step detection scheme, wherein x-ray photons are stopped by the scintillator, and the scintillator produces photons, mostly in the visible range. These photons are then detected by a suitably placed detector. One embodiment of the present invention involves vapor-deposition of CsI(Tl) on a fiberoptic faceplate and a low cost graphite substrate. The black surface of the substrate material minimizes optical scatter at the CsI-carbon interface, thereby improving the spatial resolution. Due to its black color, amorphous carbon substrates reduce the total light output, but provide an excellent spatial resolution. A reflective substrate may be formed by vapor deposition of a high reflectance material such as, for example, aluminum or $TiO_2$ on graphite prior to CsI(Tl) deposition. The fiberoptic faceplates with 6 µm fibers and interstitial extramural absorption fibers (EMA) can be obtained from sources such as Incom, Inc., Southbridge, Mass. The substrates can be subjected to plasma cleaning procedures to ensure good film adhesion. Currently, it is possible to produce up to $10 \times 10$ $cm^2$, up to 500+ µm thick screens. As a scanner may be used for x-ray energies ranging from 30 kVp to 65 kVp, films of various thickness in the range of 100 µm to 2 mm can be deposited to ensure >90% absorption of x-rays. A specially designed planetary system may be used to obtain better than 0.3% thickness non-uniformity. Care should be exercised to maintain the Tl activator concentration in the evaporated films as this can effect light output properties of the resulting screens as set forth below.

An important parameter to control is the Tl activator concentration in vapor deposited films. This is accomplished by co-evaporating Tl with CsI. For high light yield, higher Tl concentration of 0.5 to 0.7 mole % can be used. For high resolution, a moderate 0.2 to 0.3 mole % Tl can be incorporated in the films. Resulting films can be annealed to ensure response uniformity over the entire film area.

Following their deposition, microcolumnar CsI(Tl) films can be coated with reflective layer(s), such as for example, $Al_2O_3$, aluminum, white paint, and the like, and a moisture protective barrier, such as for example SiO and $Si_3N_4$, ZrO and $SiO_2$, and the like. Where films are deposited on an amorphous carbon substrate, only a moisture protective layer may be deposited. To achieve highly reflective coat, 250 nm thick 3 and one half to 5 and one half bi layers of SiO and $Si_3N_4$ ($n_{SiO}$=1.4 and $n_{Si3N4}$=1.6 to 2.1) can be formed. The order and thickness of each of these layers can be tailored to alter reflection/transmission properties of the coatings. Similarly, coatings of ZrO ($n_{ZrO}$=2.3) and SiO2 ($n_{SiO2}$=1.5) can be used. These can be formed using a plasma enhanced chemical vapor deposition (PECVD) technique.

In a particular embodiment comprising a fiberoptic based CsI(Tl) screen, a polymer-metal bi-layer combination can also be considered. A thin polymer layer can be formed on the relatively rough CsI(Tl) film surface (arising from needle shaped micro-columns) to improve the film 'flatness,' which is known to affect the reflective properties of coatings. Subsequently, a high reflectance metal layer, such as, for example, aluminum can be deposited using e-beam evaporation.

In embodiments of the present invention comprising an amorphous carbon based screen, the CsI(Tl) side can be coupled to the CCD. After deposition of CsI(Tl) a transparent protective hard coat of Aluminum Oxide can be formed using plasma enhanced deposition process. During this process, substrates are maintained at room temperature to prevent damage to the CsI(Tl). It is estimated that the hard coat layer thickness can vary between about 500 nm to about 1.5 µm.

Coating technologies have been well researched and there are numerous suitable coatings and layers that can be included in the present invention, as well as numerous ways of forming coatings known in the art with required optical and/or protective properties required for the present invention.

Although the foregoing invention has been described in some detail by way of illustration and example for purposes of clarity of understanding, it will be obvious that certain changes and modifications may be practiced within the scope of the invention. All publications and patents mentioned in this specification are herein incorporated by reference into the specification to the same extent as if each individual publication or patent was specifically and individually indicated to be incorporated herein by reference.

What is claimed is:

1. A method to obtain luminescence gain from a scintillator, the method comprising providing a scintillator and applying an electric field to the scintillator so as to increase luminescence output of the scintillator during radiation detection, wherein the luminescence output comprises a number of light photons produced per unit energy deposited by a detected energetic electron.

2. The method of claim 1, wherein the electric field is applied to the scintillator by a plurality of opposed electrodes.

3. The method of claim 2, wherein the electric field is applied to the scintillator by a pair of opposed electrodes.

4. The method of claim 2, wherein the electric field is applied to the scintillator by electrodes separated from the scintillator by a dielectric.

5. The method of claim 4, wherein the dielectric is a solid, a liquid or a gas.

6. The method of claim 2, wherein the electrodes extend past the edges of the scintillator.

7. The method of claim 2, wherein at least one of the electrodes comprises an electrically continuous conductor.

8. The method of claim 2, wherein at least one of the electrodes comprises a pattern of electrically isolated conductors.

9. The method of claim 8, wherein at least one of the electrodes comprises a continuous resistive layer.

10. The method of claim 8, further comprising providing an identification assembly associated with each of the electrically isolated conductors so as to obtain position information from the scintillator.

11. The method of claim 10, wherein the identification assembly is provided to measure position by charge division.

12. The method of claim 2, wherein the electrodes are applied directly to the scintillator by vapor deposition, painting or gluing the electrodes.

13. The method of claim 1, wherein the scintillator is single crystal, amorphous or microcolumnar.

14. The method of claim 13, wherein the scintillator is cesium iodide activated by thallium (CsI(Tl)), cesium iodide activated by sodium (CsI(Na)), sodium iodide activated by thallium (NaI(Tl)), zinc sulfide or zinc oxide (ZnS or ZnO), yttrium aluminum perovskite activated by cerium (YAP(Ce)), yttrium aluminum garnet activated by cerium (YAG(Ce)), bismuth germinate (BGO), calcium fluoride activated by europium (CaF(Eu)), lutetium aluminum garnet activated by cerium (LuAG(Ce)), gadolinium silicate doped with cerium (GSO), cadmium tungstate ($CdWO_4$; CWO), lead tungstate ($PbWO_4$; PWO), double tungstate of sodium and bismuth ($NaBi(WO_4)_2$; NBWO), zinc selenide doped with tellurium (ZnSe(Te)), lanthanum bromide activated by cerium ($LaBr_3$(Ce)), cerium bromide ($CeBr_3$), or lanthanum chloride activated by cerium ($LaCl_3$(Ce)).

15. The method of claim 12, wherein the scintillator is CsI(Tl).

16. The method of claim 1, wherein the applied electric field is higher than about 50,000 Volts/cm.

17. The method of claim 1, wherein the applied electric field is higher than about 100,000 Volts/cm.

18. The method of claim 1, wherein the applied electric field is selected to obtain a desired level of amplification.

19. The method of claim 1, wherein the applied electric field is temporally a substantially constant field.

20. The method of claim 1, wherein the applied electric field is an alternating field.

21. A device to obtain luminescence gain from a scintillator by application of an electric field to the scintillator, the device comprising a scintillator and an assembly for coupling a plurality of electrodes to the scintillator so as to provide an electric field to the scintillator to increase luminescence output of the scintillator during radiation detection, wherein the luminescence output comprises a number of light photons produced per unit energy deposited by a detected energetic electron.

22. The device of claim 21 further comprising a photodetector optically coupled to the scintillator.

23. The device of claim 22, wherein the photodetector comprises a photodiode, photomultiplier tube, or avalanche diode.

24. The device of claim 21, further comprising a radiation source.

25. The device of claim 24, wherein the radiation source provides electrons, gamma-rays, x-rays, or protons.

26. The device of claim 21, further comprising a plurality of electrodes coupled to the scintillator.

27. The device of claim 21, wherein the plurality of electrodes comprises a pair of electrodes, with electrodes of the pair positioned on opposite sides of the scintillator.

28. The device of claim 21, wherein the electrodes comprise electrodes applied directly to the scintillator by vapor deposition, painting or gluing.

29. The device of claim 21, further comprising a dielectric disposed between an electrode and the scintillator.

30. The device of claim 29, wherein the dielectric is a solid, liquid or gas.

31. The device of claim 21, wherein the electrodes extend past the edges of the scintillator.

32. The device of claim 21, wherein at least one of the electrodes comprises an electrically continuous conductor.

33. The device of claim 21, wherein at least one of the electrodes comprises a pattern of electrically isolated conductors.

34. The device of claim 33, further comprising an assembly to identify each of the isolated conductors so as obtain position information of a detection event from the scintillator.

35. The device of claim 33, further comprising an assembly to measure position by charge division.

36. The device of claim 21, wherein at least one of the electrodes comprises a continuous resistive layer.

37. The device of claim 21, wherein the scintillator comprises CsI(Tl).

38. The device of claim 21, further comprising an energy source coupled to the plurality of electrodes to provide an electric field to the scintillator.

39. The device of claim 21, wherein an electrode comprises a guard ring electrode.

40. The device of claim 21, wherein the plurality of electrodes comprises a guard ring electrode.

41. A device for obtaining luminescence gain from a scintillator by the application of an electric field to such scintillator, wherein scintillator luminescence comprises a number of light photons produced per unit energy deposited by a detected energetic electron, the device comprising:

an assembly comprising a plurality of scintillator layers, each scintillator layer of the plurality disposed between a pair of electrode layers, the electrode layers coupled to the scintillator layer so as to provide an electric field to the scintillator layer to increase luminescence output of the scintillator layer during radiation detection.

42. The device of claim 41, wherein a single electrode layer is disposed between adjacent scintillator layers.

43. The device of claim 41, further comprising a radiation source.

44. The device of claim 43, wherein the radiation source is an ionizing radiation source.

45. The device of claim 41, further comprising an energy source coupled to a pair of electrode layers to provide an electric field across a scintillator layer disposed between the pair of electrodes.

46. The device of claim 41, further comprising a photodetector optically coupled to a scintillator layer of assembly.

47. The device of claim 41, wherein an electrode layer comprises a single electrode.

48. The device of claim 41, wherein an electrode comprises a plurality of electrodes.

49. The device of claim 41, wherein the electric field is produced by a voltage applied in a cascade across scintillator layers in the assembly.

50. The device of claim 41, wherein the electric field is produced by a voltage that is applied to alternating electrode layers.

51. The device of claim 41, wherein the assembly comprises a transparent conducting layer disposed between each two layers of assembly.

52. The device of claim 51, wherein the transparent conducting layer is a transparent oxide layer, a transparent thin metal layer, or a transparent metal nitride layer.

53. The device of claim 52, wherein the transparent oxide layer comprises ITO, ZnO, $IN_2O_3$, or $SnO_2$.

54. The device of claim 52, wherein the transparent thin metal layer comprises Ti, Zr, Hf, Nb, Ta, Cr, Mo, W, Co, Pd, Pt, Ir, Ru, Rh, Cu, Ag, Au, or Al.

55. The device of claim 52, wherein the transparent metal nitride layer comprises a transition metal nitride (TMN), a TMN containing aluminum ($TM_xAl_{(1-x)}N$), a TMN containing gallium ($TM_xGa_{(1-x)}N$), or a TMN containing indium ($TM_xIn_{(1-x)}N$).

56. The device of claim 41, wherein the electrodes are configured to obtain a substantially non-uniform electric field that is strongest nearer the positive electrode.

57. The device of claim 41, wherein the applied electric field comprises an alternating field having a frequency range of 100 to 1000 MHz.

58. A cathode ray tube (CRT) device, comprising:
a cathode ray tube;
a scintillator coupled to a face of a CRT substrate;
an assembly for coupling a plurality of electrodes to the scintillator so as to provide an electric field to the scintillator to increase luminescence output of the scintillator during radiation detection, wherein the luminescence output comprises a number of light photons produced per unit energy deposited by a detected energetic electron;
an energy source coupled to the plurality of electrodes to provide the electric field to the scintillator; and
an activated electron source.

59. The device of claim 58, wherein the scintillator is single crystal, amorphous or microcolumnar.

60. The device of claim 59, wherein the scintillator is cesium iodide activated by thallium (CsI(Tl)), cesium iodide activated by sodium (CsI(Na)), sodium iodide activated by thallium (NaI(Tl)), zinc sulfide or zinc oxide (ZnS or ZnO), yttrium aluminum perovskite activated by cerium (YAP(Ce)), yittrium aluminum garnet activated by cerium (YAG(Ce), bismuth germinate (BGO), calcium fluoride activated by europium (CaF(Eu)), lutetium aluminum garnet activated by cerium (LuAG(Ce)), gadolinium silicate doped with cerium (GSO), cadmium tungstate ($CdWO_4$; CWO), lead tungstate ($PbWO_4$; PWO), double tungstate of sodium and bismuth ($NaBi(WO_4)_2$; NBWO), zinc selenide doped with tellurium (ZnSe(Te)), lanthanum bromide activated by cerium ($LaBr_3$(Ce)), cerium bromide ($CeBr_3$), or lanthanum chloride activated by cerium ($LaCl_3$(Ce)).

61. The device of claim 59, wherein the scintillator is CsI(Tl).

62. A Field Emission Display (FED) device, comprising:
a scintillator;
an assembly for coupling a plurality of electrodes to the scintillator so as to provide an electric field to the scintillator to increase luminescence output of the scintillator during radiation detection, wherein the luminescence output comprises a number of light photons produced per unit energy deposited by a detected energetic electron;
an energy source coupled to the plurality of electrodes to provide the electric field to the scintillator;
a video controlled array of microbeams that provide an array of electrons aimed to strike the scintillator; and
a display substrate.

63. The device of claim 62, wherein the scintillator is single crystal, amorphous or microcolumnar.

64. The device of claim 63, wherein the scintillator is cesium iodide activated by thallium (CsI(Tl)), cesium iodide activated by sodium (CsI(Na)), sodium iodide activated by thallium (NaI(Tl)), zinc sulfide or zinc oxide (ZnS or ZnO), yttrium aluminum perovskite activated by cerium (YAP(Ce)), yittrium aluminum garnet activated by cerium (YAG(Ce), bismuth germinate (BGO), calcium fluoride activated by europium (CaF(Eu)), lutetium aluminum garnet activated by cerium (LuAG(Ce)), gadolinium silicate doped with cerium (GSO), cadmium tungstate ($CdWO_4$; CWO), lead tungstate ($PbWO_4$; PWO), double tungstate of sodium and bismuth ($NaBi(WO_4)_2$; NBWO), zinc selenide doped with tellurium (ZnSe(Te)), lanthanum bromide activated by cerium ($LaBr_3$(Ce)), cerium bromide ($CeBr_3$), or lanthanum chloride activated by cerium ($LaCl_3$(Ce)).

65. The device of claim 63, wherein the scintillator is CsI(Tl).

* * * * *

UNITED STATES PATENT AND TRADEMARK OFFICE
CERTIFICATE OF CORRECTION

| | |
|---|---|
| PATENT NO. | : 7,612,342 B1 |
| APPLICATION NO. | : 11/535797 |
| DATED | : November 3, 2009 |
| INVENTOR(S) | : Vivek V. Nagarkar |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 305 days.

Signed and Sealed this

Fourteenth Day of December, 2010

David J. Kappos
*Director of the United States Patent and Trademark Office*